United States Patent
Stille et al.

(10) Patent No.: US 10,472,582 B2
(45) Date of Patent: Nov. 12, 2019

(54) PROCESS AND APPARATUS FOR HYDROGEN SULFIDE REMOVAL

(71) Applicant: Nederlandse Organisatie voor Toegepast-Natuurwetenschappelijk Onderzoek TNO, 's-Gravenhage (NL)

(72) Inventors: Leon Christian Stille, 's-Gravenhage (NL); Marco Johannes Gerardus Linders, 's-Gravenhage (NL); Earl Lawrence Vincent Goetheer, 's-Gravenhage (NL)

(73) Assignee: NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 210 days.

(21) Appl. No.: 15/103,551

(22) PCT Filed: Dec. 11, 2014

(86) PCT No.: PCT/NL2014/050853
§ 371 (c)(1),
(2) Date: Jun. 10, 2016

(87) PCT Pub. No.: WO2015/088342
PCT Pub. Date: Jun. 18, 2015

(65) Prior Publication Data
US 2016/0312139 A1  Oct. 27, 2016

(30) Foreign Application Priority Data
Dec. 11, 2013  (EP) .................................. 13196691

(51) Int. Cl.
*C10L 3/10* (2006.01)
*C01B 17/05* (2006.01)
(Continued)

(52) U.S. Cl.
CPC .............. *C10L 3/103* (2013.01); *B01D 53/00* (2013.01); *B01D 53/52* (2013.01); *B01D 53/78* (2013.01);
(Continued)

(58) Field of Classification Search
CPC ................................ C10L 3/103; B01D 53/00
See application file for complete search history.

(56) References Cited

U.S. PATENT DOCUMENTS

| | | | |
|---|---|---|---|
| 4,455,287 | A | 6/1984 | Primack et al. |
| 4,784,775 | A | 11/1988 | Hardison |

(Continued)

FOREIGN PATENT DOCUMENTS

| | | |
|---|---|---|
| EP | 0215505 A2 | 3/1987 |
| WO | 0156683 A1 | 8/2001 |
| WO | 2012175630 A1 | 12/2012 |

OTHER PUBLICATIONS

International Search Report to corresponding Int'l Pat. Appl. No. PCT/NL2014/0505853, dated Apr. 5, 2015, 3 pages.

*Primary Examiner* — Matthew J Merkling
(74) *Attorney, Agent, or Firm* — Tarolli, Sundheim, Covell & Tummino LLP

(57) ABSTRACT

The invention is directed to a process and apparatus for removing hydrogen sulfide from a gas stream comprising biogas. In accordance with the invention the gas stream is contacted with an oxidizing agent present in a vessel, whereby said hydrogen sulfide is oxidized into elemental sulfur and said oxidizing agent is reduced, wherein oxygen containing gas is also fed to said vessel, wherein said oxygen oxidizes at least part of said reduced oxidizing agent.

12 Claims, 1 Drawing Sheet

(51) Int. Cl.
    *B01D 53/52*         (2006.01)
    *B01D 53/78*         (2006.01)
    *B01D 53/00*         (2006.01)

(52) U.S. Cl.
    CPC .......... *C01B 17/05* (2013.01); *B01D 2251/10* (2013.01); *B01D 2251/90* (2013.01); *B01D 2251/902* (2013.01); *B01D 2251/904* (2013.01); *B01D 2257/304* (2013.01); *B01D 2258/05* (2013.01); *C10L 2290/54* (2013.01); *C10L 2290/60* (2013.01); *Y02P 20/145* (2015.11)

(56) References Cited

U.S. PATENT DOCUMENTS

| | | |
|---|---|---|
| 5,004,588 A | 4/1991 | Nisula et al. |
| 5,096,691 A | 3/1992 | Bedell |
| 2005/0002840 A1 | 1/2005 | Tupper |
| 2010/0036187 A1* | 2/2010 | Gunther ............ B01D 53/1425 585/802 |

* cited by examiner

PROCESS AND APPARATUS FOR HYDROGEN SULFIDE REMOVAL

RELATED APPLICATIONS

This application is a 35 U.S.C. § 371 national stage application of PCT Application No. PCT/NL2014/050853, filed on Dec. 11, 2014, which claims priority from European Patent Application No. 13196691.3 filed on Dec. 11, 2013, the contents of which are incorporated herein by reference in the entireties.

FIELD OF THE INVENTION

The invention is directed to a process and apparatus for hydrogen sulfide removal from biogas. More particularly the invention is directed to processes and apparatuses for the removal of $H_2S$ on a small scale, such as removal of gas streams produced by small scale biogas digesters for domestic use.

BACKGROUND OF THE INVENTION

Small scale biogas digesters are used increasingly to supply biogas to households worldwide in. Biogas thus produced is used for different applications, amongst others cooking. In many small-scale digesters configurations it is quite common that no further treatment of the biogas is applied before it is burnt. This is in particular the case in developing countries, where the need for purifying gases before burning them conflicts with the perceived associated costs thereof.

Hydrogen Sulfide ($H_2S$) is present in varying concentrations in biogas. $H_2S$ has negative effects on the durability of the equipment, because when burnt it may be converted into sulfur oxides, which are highly corrosive, in particular in combination with water, thus resulting in high material replacement costs. Moreover, the presence of sulfur oxides due to combustion of $H_2S$ can have detrimental consequences for the people exposed to the flue gases. Furthermore, $H_2S$ is very poisonous by itself and exposure must be avoided at all times Therefore removal of $H_2S$ is essential for an optimal functioning of the biogas system, as well as for the health of the users of these systems and their environment.

Biogas is produced during anaerobic digestion of organic materials such as manure, sewage sludge, organic fractions of household and industrial waste and energy crops. It is typically produced at atmospheric pressure. Biogas can be used as a renewable energy source, for example as fuel for vehicles or as a substitute for natural gas. Additional advantages are a lower release of methane into the atmosphere (methane is a known greenhouse gas) compared to traditional manure management and landfills, as well as the simultaneous production of a high quality digestate for applications as fertilizer.

The exact composition of the biogas is amongst others dependent on the type of material used in the anaerobic digestion. Typically it contains 50-70 vol % methane, 30-50 vol % $CO_2$ and 0-4000 ppm $H_2S$. These high amounts of $CO_2$ and $H_2S$ in biogas result in a relatively low energy content per volume, and therefore needs to be treated prior to use as energy source. Raw biogas, i.e. biogas as directly obtained after the anaerobic digestion, can be cleaned of unwanted substances such as particles, water, $H_2S$ and $CO_2$ in a process called upgrading. The resulting upgraded biogas is much higher in methane content than the raw biogas.

Several countries have defined standards with which the upgraded biogas must comply before grid injection or utilization as vehicle fuel. In 2010, the European Commission mandated CEN (M/475) to set European standards for upgraded biogas requirements. This stresses the importance of the biogas upgrading process.

$H_2S$ removal from gas streams is commonly carried out using a regenerative absorption solution. One of the typical classes of such regenerative systems comprises an agent that can oxidize $H_2S$ into elemental sulfur ($S_0$). In this reaction the oxidizing agent is reduced. A commonly used oxidizing agent is for instance Fe(III)NTA, a complex of nitrilotriacetic acid, $N(CH_2COOH)_3$, NTA, a chelating agent and Fe(III). Normally an aqueous solution of oxidizing agent is used. In a subsequent step the reduced oxidizing agent is regenerated by oxidizing it back to its original state, for instance by reacting it with oxygen. Such a process is well known, see for instance EP-A-0 215 505. Current systems are for large scale application that have separate vessels in which the absorption of $H_2S$ and the regeneration of the solvent takes place. Although these systems are commercially interesting systems, they cannot be economically used for small-scale household biogas applications due to relatively high capital and operational cost at the small scale level. Moreover, the complexity level exceeds the applicability demands for small scale.

It is an object of the present invention to provide a cost-effective, simple and robust, regenerative system for effective removal of $H_2S$ from biogas obtained from small scale biogas digesters.

It was found that this and other objectives may be reached by carrying out the $H_2S$ oxidation step and the regeneration of the oxidizing agent in the same vessel, and optionally at the same time, viz. without requiring a separate regeneration vessel, or regeneration phase. The oxidation and regeneration step can be carried out simultaneously or sequentially.

SUMMARY OF THE INVENTION

Thus in a first aspect the present invention is directed to a process for removing hydrogen sulfide from a gas stream, wherein said gas stream is contacted with an oxidizing agent by feeding said gas stream to a vessel containing said oxidizing agent, whereby said hydrogen sulfide is oxidized into elemental sulfur and said oxidizing agent is reduced, characterized in that oxygen containing gas is also fed to said vessel, wherein said oxygen oxidizes at least part of said reduced oxidizing agent.

Surprisingly the reduction (by the $H_2S$) and regeneration (by the oxygen) of the oxidizing agent can be carried out in the same vessel. It is also possible to carry out both reactions at the same time. Normally air is used as the oxygen containing gas. Because air contains a substantial amount of nitrogen, the caloric value of the resulting biogas mixture is correspondingly lowered. Surprisingly this does not have to be a problem, provided that the amount of air mixed with the biogas is limited. The amount of air used for the oxidation of the oxidizing agent is therefore preferably such that the energy content per volume of the treated biogas is lowered by 20% or less, more preferably is lowered by 10% or less.

U.S. Pat. No. 5,004,588 discloses a single vessel for the oxidation of $H_2S$ with a metal chelate catalyst and the in situ regeneration of that catalyst with oxygen which is always present in the vessel. However, the device described in this document aims at natural gas purification and is too complex to be used at a small scale purification of biogas for domestic use. Moreover, natural gas differs from biogas in that it is typically produced at elevated pressures. As a consequence, gas treatment processes of natural gas also often operate at elevated pressures. Also U.S. Pat. No. 5,004,588 discloses a process that operates at elevated pressures.

Alternatively, the regeneration of the oxidizing agent can be carried out when the gas stream is stopped, in particular if there is no demand for clean gas. The present inventors realized that a typical stove under normal use conditions is idle for the majority of the time. This period can be used to regenerate the oxidizing agent using air.

The present inventors realized that mixing air with biogas prior to a desulfurization step would normally not be done due to the fact that, in the case of simultaneous performing the reduction (by the $H_2S$) and regeneration (by the oxygen) of the oxidizing agent, the energy content of the treated gas will be lowered. In the case of performing the reduction step sequential to the regeneration in the same vessel, this would lead to a discontinuous treatment of the biogas. For both cases this would lead to a very uneconomical upgrading of biogas at large scale. However, in the case of small scale equipment, such as a stove for domestic use, this is not problematic, and in fact enables the oxidizing agent to be reduced in situ, without requiring complex switching schemes using many valves.

In accordance with the present invention it is preferred to minimize the number of valves so that a cheap and robust design is obtained. This is particularly important since the apparatus and process of the invention are especially suitable for use in developing countries. For the acceptance of the technology of the present invention it is critical that the differences with operation of common stoves, i.e. stoves without a desulfurization step, are minimized.

BRIEF DESCRIPTION OF THE DRAWINGS

In accordance with the present invention it is preferred that there is one single valve to control the flow of gases (air and biogas).

DETAILED DESCRIPTION OF THE INVENTION

Since biogas is typically produced at atmospheric pressure, typically the gas stream is contacted with the oxidizing agent present in the vessel at atmospheric pressure.

Alternatively, the oxygen containing gas may be fed as a separate stream (2'). Stream (2) would then be optional. This allows for a flow of oxygen containing gas that is independent from the biogas flow. This could be desirable in an embodiment where regeneration continues or starts after the biogas flow is stopped (for instance by closing valve (8)).

A check valve (not shown) may be installed in the line for oxygen containing gas (2) or (2') to avoid gases escaping to the environment.

Figure 1:
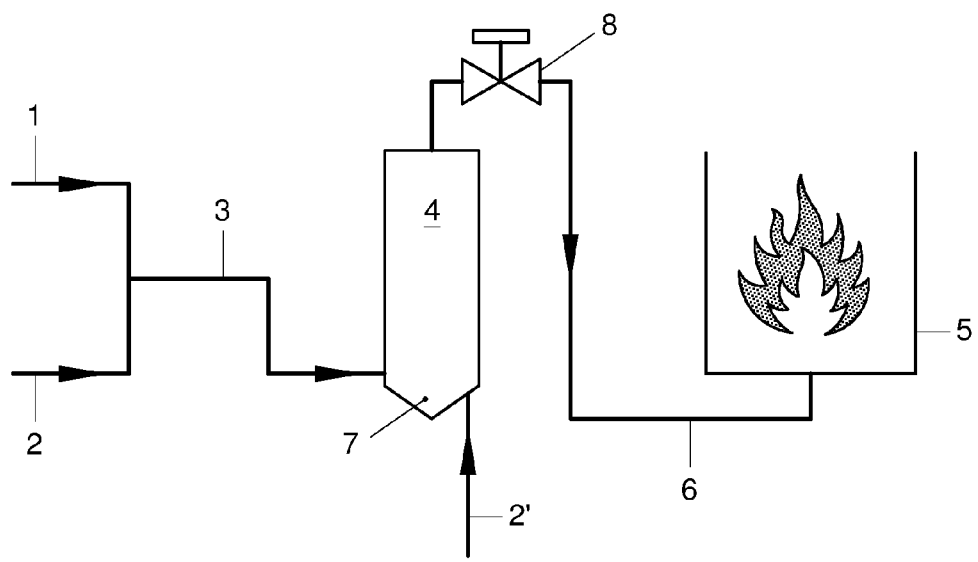
FIG. 1 shows schematically an apparatus that can be used in accordance with the present invention. A stream of biogas containing $H_2S$ (1) is combined with a stream of oxygen containing gas (2), preferably air. Optionally, stream (1) can have a pretreatment step to remove condensates. The mixture (3) is then fed to desulfurization vessel (4). A desulfurized gas stream (6) is obtained, which may be controlled by valve (8). The desulfurized gas stream (6) is fed to stove (5) where it is burnt. The oxygen containing gas can be fed to the system using a pump (not shown), for instance a pump operated by a Sterling engine, which uses the heat of the stove or an electric pump, operated by a battery. It is also possible to make use of the Venturi effect by feeding the oxygen containing gas (2) to a portion in a pipe carrying biogas (1) to the pipe containing the mixture (3) which has a smaller cross sectional diameter than the rest of the pipe.
Figure 2:
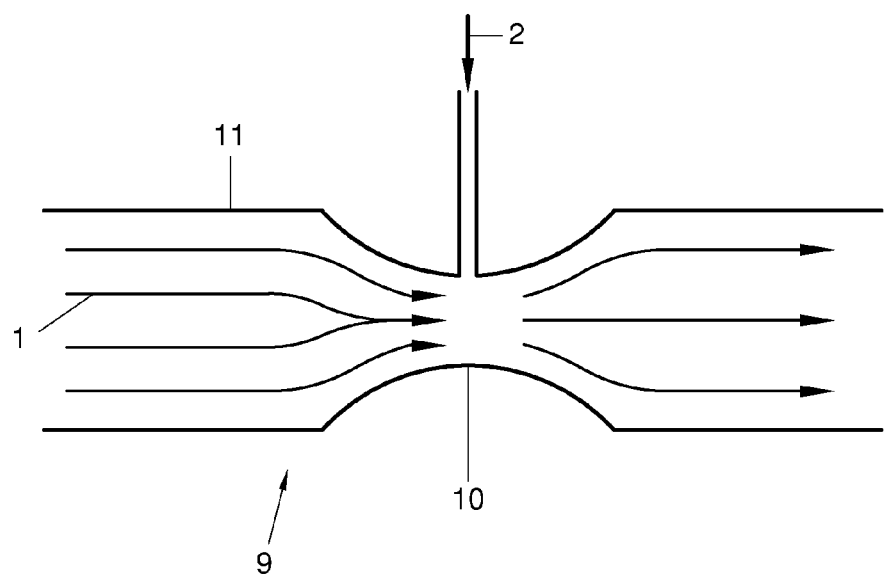
FIG. 2 is a schematic representation of a venturi mixer (9). A venturi mixer is advantageous as it contains no moving parts and is therefore very robust. The venturi mixer is placed in the intake gas stream (1). Constriction (10) in duct (11) creates a slight negative pressure as gas is drawn through it. This negative pressure is used to draw air (2), or other oxygen containing gas, into the gas stream. The amount of oxygen containing gas can be regulated towards the minimal required amount of oxygen needed for the regeneration of the reduced oxidizing agents

In accordance with the invention $H_2S$ is oxidized into elemental sulfur, which is solid and is typically formed as small flakes. These solid sulfur flakes are large enough to settle due to gravity to the bottom of vessel (4), which area is roughly as indicated by reference numeral (7) in FIG. 1. Here the solid sulfur is collected. Due to this configuration, optimal conditions for sulfur flake growth can be created. It is preferred that the flow of oxygen containing gas is not hampered by the presence of sulfur. This can for instance be done by introducing the oxygen containing gas flow at an elevated height, so that it protrudes above any pile of sulfur that may have formed. The introduction of the gas(es) into the reaction vessel can be done in such a manner that small gas bubbles are created. This can be done using for example a gas sparger. This gas sparger can optionally be coated to prevent fouling. The vessel may also be coated to prevent fouling.

The vessel may be designed in such a way that minimal two zones are present. The top zone may be designed for optimal $H_2S$ removal from the gas. The bottom zone may be designed for optimal conditions for settling of the solid sulfur particles. The bottom zone can be divided into two different sections. The top section of the bottom zone can be designed in such a manner for optimal growth of the particles. The bottom section of the bottom zone may be designed as settling space for the solid sulfur particles. The design of the total reactor vessel can be done in such a manner that sulfur settled in the bottom zone is not redispersed into the top zone. Thus different zones can be present in the reaction vessel.

The vessel designed with the zones and sections in accordance with the present invention is particularly beneficial for household-use since it requires less maintenance. The possibility to perform regular maintenance on the vessel may be limited. This may particularly be the case when the vessel is used in remote places, in particular in developing countries, that are difficult to access due to poor infrastructure.

The amount of gas treated in accordance with the invention typically ranges from 1-20 $m^3$/day (unless indicated otherwise, all volumes as used herein are expressed at normal conditions: 25° C. and 1 atm). Another application area is for community scale, typically ranging from 50-250 $m^3$/day.

It is preferred to provide vessel (4) in the form of a cartridge or cartridge like device. Depending on the amount of $H_2S$ present in the biogas feed (which may typically range from 50 ppmv to 6000 ppmv, corresponding to a typical elemental sulfur yield of 0.5 kg to 30 kg per year, respectively), such a cartridge need to have a volume that is sufficiently large to hold the required amount of sulfur. Typically the volume may range from 1 $dm^3$ to 25 $dm^3$. The shape of the container can be chosen in such a way to allow the elemental sulfur to be settled away from the gas inlet. Examples are vessels which contain a sump.

In general the volume of vessel (4) typically ranges from 1 dm³ to 25 dm³, preferably 10-20 dm³. Such a volume is sufficient to provide with the typical gas flows for normal cooking applications for a residence time that is sufficient to get a $H_2S$ removal efficiency that is higher than 95 vol. %, preferably higher than 99 vol. %. The vessel (4) can optionally be coated to prevent fouling.

It is also possible to provide vessel (4) with an indicator. For example, when iron based reducing agents are used, in particular an aqueous Fe(III)NTA solution, the color of the solution may change and/or red or black flakes may form therein, indicating that the reducing agent has degenerated. Typically this is the result of formation of iron oxides. When such a color change is observed, which can be facilitated by making at least part of the walls of vessel (4) from a transparent material, the user knows it is time to replace the vessel, or at least refresh its contents. In a preferred embodiment, only the vessel is replaced, without requiring the replacement of the other elements of the system, such as the gas inlet(s).

Additionally or alternatively the vessel may be provided with an indicator indicating the amount of biogas which has passed through the device.

It is important to note that elemental solid sulfur has a relatively high value. Therefore collecting the cartridges filled with sulfur is economically interesting, which provides for a strong incentive to use the desulfurization step. In many techniques that have been specifically designed for developing countries providing an economical motivation has proven to be of key importance. Elemental sulfur may be used as a raw material in chemical industry, but also as a fertilizer (together with nitrogen (N), phosphorus (P), potassium (K), calcium (Ca) and magnesium (Mg), sulfur (S) is one of the six macronutrients).

A further benefit of the invention is that the amount of sulfur formed is directly correlated to the amount of biogas produced. Thus the amount of sulfur produced can be used as a measure for the number of Certified Emission Reductions (CERs, commonly known as "carbon credits") that may be claimed. Because of the direct link, this method will be approved by a Clean Development Mechanism Executive Board (CDM EB).

Due to the low biogas volumes involved, and the infrequent use of the biogas (only during cooking time) the formed elemental sulfur can settle at the bottom of the vessel. The amount of solution of oxidizing agent required can be low and adapted to the local situation to allow for collection and solvent refreshment over a period of time A typical frequency would range from 1 month to several years, for instance once a year.

The oxidizing agent can be any compound or mixture thereof suitable for this purpose and that may be obtained as a solution. In general this agent is a compound that comprises a metal (such as $Fe^{2+}/Fe^{3+}$, $V^{4+}/V^{5+}$, Cu, Zn, Mn, or Mg), a complexing agent which forms a complex with said metal (such as NTA (nitrilotriacetic acid), EDTA (ethylene diamine tetraacetic acid), HEDTA (hydroxyethyl ethylenediamine triacetic acid), DTPA (diethylene triamine pentaacetic acid), TEA (triethanolamine), CyDTA (trans-1,2-diaminocyclohexane-N,N,N',N'-tetraacetic acid), MIDA (methyl imino diacetic acid), PDTA (1,3-propylenediaminetetraacetic acid), BDTA (1,4-butane diamine tetraacetic acid), BnDTA (benzyl diamine tetraacetic acid), etidronic acid (HEDP), and combinations thereof), and a radical scavenger (such as thiodiglycolic acid, 3,3-thiodipropionic acid, sodium thiocyanate, sodium dithionite, ammonium thiosulfate, sodium thiosulfate, N,N-diethylhydroxylamine, thiourea, thiosemicarbazide, bisulphite, sodium benzoate, paratoluene sulphonic acid, potassium iodide, potassium bromide, potassium chloride, 2-prop anol, 1-butanol, ethylene glycol, sodium formate, sucrose, sorbitol, nitrites, amino acids, aliphatic aldehydes, or aryl sulfonic acids).

Optionally, biocides can be added to the solvent to prevent microbial growth.

The present invention thus provides a simple, cheap, robust and easy to handle design that is especially suitable for use in developing countries.

The invention claimed is:

1. Process for removing hydrogen sulfide from a gas stream comprising biogas, wherein the biogas comprises 50-70 vol % methane, 30-50 vol % carbon dioxide and hydrogen sulfide up to 4000 ppm, wherein said gas stream is contacted with an oxidizing agent present in a vessel, whereby said hydrogen sulfide is oxidized into elemental sulfur and said oxidizing agent is reduced, wherein oxygen containing gas is also fed to said vessel, wherein said oxygen oxidizes at least part of said reduced oxidizing agent, and wherein said oxygen containing gas continues to be fed to said vessel after the biogas stream is stopped or said oxygen containing gas is started to be fed to said vessel after the biogas stream is stopped.

2. Process according to claim 1, wherein the feeding of said oxygen containing gas to said vessel is started at the same time the feeding of said gas stream to said vessel is started.

3. Process according to claim 1, wherein said vessel is provided in the form of a cartridge or cartridge like device.

4. Process according to claim 1, wherein said vessel is provided with an indicator indicating the vessel or cartridge or cartridge like device must be replaced.

5. Process according to claim 1, wherein said vessel is provided with an indicator indicating the amount of biogas which has passed through the device.

6. Process according to claim 1 wherein the oxidizing agent comprises at least one metal, at least one complexing agent which forms a complex with said metal and a radical scavenger.

7. Process according to claim 6 wherein said metal is selected from $Fe^{2+}/Fe^{3+}$, $V^{4+}/V^{5+}$, Cu, Zn, Mn, Mg and combinations thereof.

8. Process according to claim 6, wherein said complexing agent is selected from NTA, EDTA, HEDTA, DTPA, TEA, CyDTA, MIDA, PDTA, BDTA, BnDTA, HEDP and combinations thereof.

9. Process according to claim 6, wherein said radical scavenger is selected from thiodiglycolic acid, 3,3-thiodipropionic acid, sodium thiocyanate, sodium dithionite, ammonium thiosulfate, sodium thiosulfate, N,N-diethylhydroxylamine, thiourea, thiosemicarbazide, bisulphite, sodium benzoate, paratoluene sulphonic acid, potassium iodide, potassium bromide, potassium chloride, 2-propanol, 1-butanol, ethylene glycol, sodium formate, sucrose, sorbitol, nitrites, amino acids, aliphatic aldehydes, aryl sulfonic acids and combinations thereof.

10. Process according to claim 1, wherein said oxidizing agent further comprises one or more biocides.

11. Process according to claim 1, wherein said oxidizing agent comprises Fe(III)NTA.

12. Process according to claim 1 wherein the biogas comprises greater than 0 ppm and less than or equal to 4000 ppm of hydrogen sulfide.

* * * * *